United States Patent Office 3,666,493
Patented May 30, 1972

3,666,493
PREPARATION OF CHEESE AND PIE FILLINGS
John A. Bluemke, 256 South St., Elmhurst, Ill. 60126
No Drawing. Continuation-in-part of application Ser. No. 857,600, Sept. 12, 1969, which is a continuation of application Ser. No. 601,224, Dec. 12, 1966. This application June 8, 1970, Ser. No. 44,583
Int. Cl. A23c 23/00
U.S. Cl. 99—139
4 Claims

ABSTRACT OF THE DISCLOSURE

A food composition is prepared by whipping together (a) a homogenized preparation of fat, protein, sugar and emulsifier which has been acidified with an edible acid or lactic acid producing culture and chilled, with (b) a stabilizer of sugar, starch and milk or corn syrup solids.

---

This application is a continuation-in-part of Ser. No. 857,600 filed Sept. 12, 1969 now abandoned which in turn is a continuation of Ser. No. 601,224 filed Dec. 12, 1966, now abandoned.

This invention relates to a food composition, and more particularly to a composition especially adapted for use as a filling for pies or cakes, for example, and characterized by its high stability and outstanding organoleptic qualities.

The production and distribution through commercial channels of cakes and pies, such as are typified by the products known as cheese pies, and cheese cakes, involves a number of tough technical problems, stemming in part from the susceptibility of the fillings which are conventionally used in the production of cheese cakes and cheese pies, to a loss in character and texture after freezing and thawing. The lack of stability is particularly serious where the product, either in the form of a filling alone or in the form of a cheese cake or cheese pie, has to be frozen and shipped long distances incident to its distribution to the trade. This lack of stability is reflected in such phenomena as syneresis or weeping which often occurs after thawing the frozen product, which is considered undesirable by the trade, and which takes away eye appeal from the product.

Production of cheese cakes and cheese pies generally involves baking the whole product, i.e., with a filling. Since the baking characteristics of the filling and of the pastry portion of the product are different, there is required a significant amount of know-how to match up, as it were, the time, temperature and other phenomena involved in the preparation of such products.

It will therefore be advantageous if cheese pies and cheese cakes could be produced without including baking of the filling, and without loss of flavor, and other desirable characteristics of today's conventional cheese pies and cheese cakes.

A principal object of this invention is to provide a new and unique food product.

A further object of this invention is to provide an improved filling for pies and cakes.

Another object is to provide a new and useful pie and cake filling, of the type associated with cheese pies and cheese cakes, and characterized by high stability with respect to texture and form against the deleterious influences of freezing and thawing.

In the practice of my invention I prepare a first composition which will be referred to hereinafter as Composition A and which is composed essentially of an edible fat or oil, whey, hydrolyzed cereal solids such as corn syrup solids, a proteinaceous stabilizing agent such as sodium caseinate, gelatin, an edible acid such as lactic acid or a means of producing it, colors, flavors, emulsifiers, edible buffering salts such as sodium citrate, and water.

After producing Composition A in a manner which will be described hereinafter, the resulting product is whipped together with a composition I shall refer to as Composition B, which acts as a stabilizer for the mixture.

The resulting composite mixture of Composition A and Composition B is eminently suitable for use as a filling for cheese cake or cheese pie with outstanding properties of stability against deterioration after freezing and thawing, and with highly desirable organoleptic qualities.

COMPOSITION A

A preferred form of Composition A and the ranges of components which can be used are set out below:

| Basic formula, percent | | Range, percent |
|---|---|---|
| 18.00 | 110° F. melting coconut oil | 3–50 |
| 5.00 | Dried whey | 1–20 |
| 4.00 | 24 D.E. corn syrup | 1–15 |
| 3.00 | Sodium caseinate | 1–6 |
| .33 | Salt | 0.1–1.0 |
| .15 | Sorbitan mono stearate | 0.05–0.4 |
| .15 | Polyoxyethylene sorbitan mono stearate | 0.05–0.4 |
| .15 | Sodium citrate | 0.05–3.0 |
| .22 | Gelatin | 0.1–3.0 |
| 4.00 | Natural lactic acid culture, artificial color, artifical flavor | 1.0–10.0 |
| 65.00 | Water | |
| 100.00 | | |

While I prefer to use 110° F. melting point coconut oil as the edible oil, other oils which can be used are such refined vegetable edible oils as soybean oil, cottonseed oil and palm kernel oil. In place of dried whey I can use nonfat milk solids, whole milk solids, lactose, or lacto albumin. Hydrolyzed cereal solids, corn syrup or corn syrup solids having a range of from about 12 to about 42 D.E. can be used for the 24 D.E. corn syrup solids set out in the preferred formulation above. Sodium caseinate is the preferred proteinaceous stabilizing agent to be used in my Composition A, as recited above, although hydrolyzed vegetable protein, such as soya, and egg protein, can also be used. In place of sorbitan monostearate and polyoxyethylene sorbitan mono stearate, other food grade surfactants or emulsifying agents, especially mono- and diglycerides can be substituted in part or in whole. Sodium citrate can be replaced by disodium phosphate or by a combination of sodium citrate and disodium phosphate or other edible buffering salts. Cellulose gums, such as carboxy methyl cellulose or methyl cellulose, can be used in lieu of the gelatin, and in place of the natural lactic acid culture, dilute edible acids such as phosphoric or lactic acid can be used.

PROCESSING OF COMPOSITION A

A preferred method of process Composition A is as follows:

The fat is heated to approximately 160° F. in a steam or a hot water jacketed blender-pasteurizer of conventional design. The heating is continued with vigorous agitation, as the sorbitan monostearate, polyoxyethylene sorbitan monostearate, sodium caseinate, and color are added and dispersed in the hot fat. The water is then added and agitation continued with the addition of the remaining ingredients. The temperature of the batch is then raised to 180° F., held there 20 to 30 minutes, homogenized at 2500 p.s.i., and passed through a plate cooler, thereby cooling in a few seconds to a temperature in the range of about 65–70° F., at which temperature it is conducted into another container for inoculation with the lactic acid bacteria starter. When this has been added and dispersed through the mixture, the batch is again passed through a homogenizer at about 500 p.s.i. so as to complete intimate dispersion of the starter culture. Without appreciable change of temperature the mixture is now "canned off" into suitable packages and the packages stored in a chamber held at a suitable temperature such as about 72° F. to permit the lactic acid bacteria to develop to the point where a soft but complete "lobber" is attained, this point being usually spoken of as the "set." The development of acid and other by-products by the bacteria may take from about 5–24 hours, depending on the temperature of the room and the strength of the lactic acid bacteria. When the proper "set" has been achieved, there will have been a lactic acid development of about 0.5–1.0%.

The product is now ready for storage in a cold chamber, held at preferably from about 32–40° F.; when completely chilled throughout, generally requiring about 24 hours, it has the form, appearance and flavor characteristics of sour cream, and is ready for use.

Referring again to the foregoing processing of Composition A, where the acidity is to be developed artificially, i.e., without the development of acid through lactic acid bacteria, but rather by incorporation of acid, the process of mixing is the same as above, except that the mix is not given a second pass through the homogenizer. The first pass is delivered through the cooler and immediately cooled to a temperature of 32° F. to 50° F. and passed to a blender vat with rapid agitation. While the mix is in a state of agitation or turbulence the diluted acid—phosphoric or lactic, for example—is gradually added to the point where 0.5 to 1.5% of acidity is attained. The mixture is now ready for "canning off."

The foregoing Composition A, if it is to be used as a component of a pie filling, is mixed with a stabilizer hereinafter referred to as Composition B. The composition of a preferred stabilizer is described as follows:

COMPOSITION B

Basic formula:                                      Range, percent
50% sugar ------------------------------------ 10–85
25% precooked starch ------------------------ 10–40
25% N.F.M.S. (non fat milk solids) artificial
   flavor or natural ------------------------- 10–80

Referring to Composition B above, the sugar can be either powdered sugar, brown sugar, invert sugar, dextrose, corn syrup solids, maltose, levulose, lactose, or fructose; and any type of starch which has been subjected to a process commonly known as "preheating" or "pregelatinization," whereby it is processed so that no further heating is required to perform its thickening or stabilizing function. The non-fat milk solids can be replaced by whole milk solids also by corn syrup solids. Various flavors may be added to the product.

The preferred precooked starch is pregelatinized tapioca starch, although other starches such as corn or potato starch, pregelatinized, can be used.

The Composition B, above, is prepared by simple mixing in conventional equipment.

By whipping together Composition A and Composition B in suitable proportion, such as about 1 to 8 parts by weight of Composition B to 1 part of Composition A, a filling results which has consistency, stability, and organoleptic characteristics superior to fillings which are conventionally used in cheese cakes or cheese pies.

It is understood that the foregoing examples have been presented by way of illustration only and are not to be considered as limiting the scope of the invention, except as defined in the appended claims.

I claim:

1. A method of producing a food composition which comprises whipping together (a) a homogenized composition containing, by weight, from 3 to 50% of edible fat or oil, 1 to 20% of dried whey, 1 to 15% of hydrolyzed cereal solids, 1 to 6% proteinaceous stabilizing agent, selected from the group consisting of sodium caseinate, hydrolyzed soya protein and egg protein, an edible acid, to bring the acidity to 0.5 to 1.5%, 0.05 to 0.4% of an emulsifying agent, 0.05 to 0.4% of edible buffering salts, and 0.1 to 3.0% gelatin, which has been chilled to a temperature of about 32–50° F. after homogenization, with (b) a stabilizer in an amount sufficient to stabilize the filling, said stabilizer comprising 10 to 85% of a sugar, 10 to 40% of a pre-cooked starch and 10 to 80% of a member selected from the group consisting of milk solids and corn syrup solids.

2. A method of producing a food composition which comprises, heating 18 parts of edible fat or oil to approximately 160° F., adding thereto 3.0 parts of a proteinaceous stabilizing agent, selected from the group consisting of sodium caseinate, hydrolyzed soya protein and egg protein, 65 parts of water, 5 parts of dried whey, 4 parts of hydrolyzed cereal solids, .15 part of sorbitan monostearate, .15 part of polyoxyethlene sorbitan monostearate, .15 part of sodium citrate and .22 part of gelatin, heating the resulting mixture to 180° F., and after holding it at that temperature for about 20–30 minutes, homogenizing the batch and cooling the material within a few seconds to a temperature in the range of about 65–70° F., adding to said batch a lactic acid bacteria starter, homogenizing the resulting mixture, placing the mixture into suitable packages, storing the packages in a temperature controlled atmosphere to permit the lactic acid bacteria to develop to the point where a soft but complete lobber is attained, storing the product in a cold chamber at a temperature from about 32–40° F., and then adding thereto a stabilizer in an amount sufficient to stabilize the filling, said stabilizer comprising 10–75% of a sugar, 10–40% of a pre-cooked starch, and 10–80% of a member selected from the group consisting of milk solids and corn syrup solids.

3. A method of producing a food composition which comprises, heating 18 parts of 110° F. melting point coconut oil to approximately 160° F., adding thereto 3.0 parts of sodium caseinate, 65 parts of water, 5 parts of dried whey, 4 parts of 24 D.E. corn syrup solids, .33 part of salt, .15 parts of sorbitan monostearate, .15 part of polyoxyethylene sorbitan monostearate, .15 part of sodium citrate and .22 part of gelatin, heating the resulting mixture to 180° F. and holding it at that temperature for about 20–30 minutes, homogenizing the batch and cooling the material within a few seconds to a temperature in the range of about 65 to 70° F., adding to said batch a lactic acid bacteria starter, homogenizing the resulting mixture, placing the mixture into suitable packages, storing the packages in a temperature controlled atmosphere to permit the lactic acid bacteria to develop to the point where a soft but complete lobber is attained, storing the product in a cold chamber at a temperature from about 32–40° F., and then adding thereto a stabilizer in an amount sufficient to stabilize the filling, said stabilizer comprising 10–75% of a sugar, 10–40% of a pre-cooked starch, and 10–80% of a member selected from the group consisting of milk solids and corn syrup solids.

4. A method of producing a food composition which comprises whipping together (A) a homogenized composition containing, by weight, from 3 to 50% of 110° F. melting point coconut oil, 1 to 20% of dried whey, 1 to 15% of 24 D.E. corn syrup solids, 0.1 to 1.0% salt, 1 to 6% sodium caseinate, an edible acid, to bring the acidity to 0.5 to 1.5%, 0.05 to 0.4% of an emulsifying agent, 0.05 to 0.4% of sodium citrate, and 0.1 to 3.0% gelatin, which has been chilled to a temperature of about 32.50° F. after homogenization, with (B) a stabilizer in an amount sufficient to stabilize the filling, said stabilizer comprising 10 to 85% of a sugar, 10 to 40% of a pre-cooked starch, and 10 to 80% of a member selected from the group consisting of milk solids and corn syrup solids.

References Cited

UNITED STATES PATENTS

| | | | |
|---|---|---|---|
| 3,359,116 | 12/1967 | Little | 99—54 |
| 3,391,002 | 7/1968 | Little | 99—54 |
| 1,928,664 | 10/1933 | Gutgeld | 99—92 |

RAYMOND N. JONES, Primary Examiner

J. M. HUNTER, Assistant Examiner

U.S. Cl. X.R.

99—92